Nov. 15, 1938.　　　P. L. BETZ　　　2,137,199
CONTROL SYSTEM FOR GAS HEATERS
Filed Aug. 30, 1935　　　2 Sheets-Sheet 2

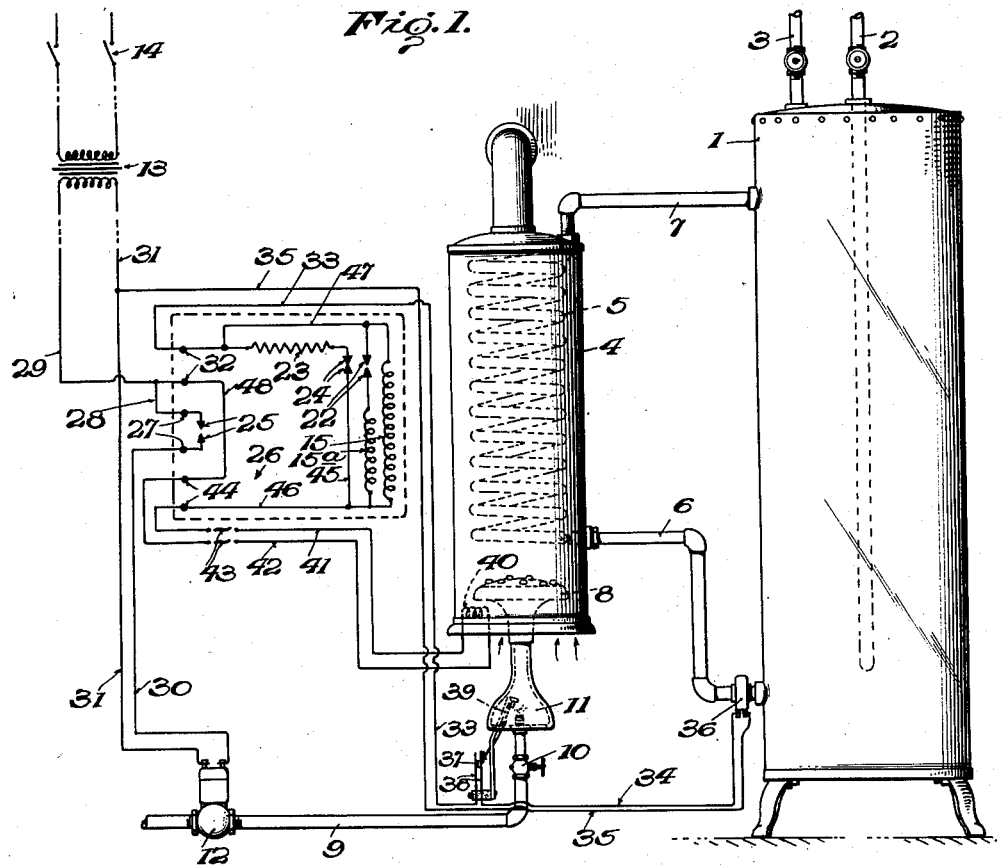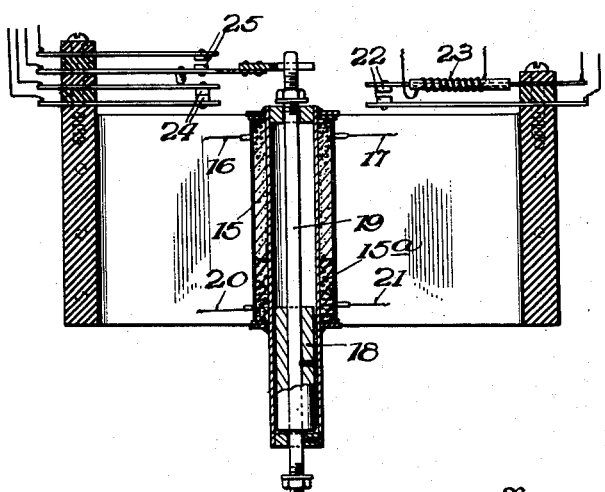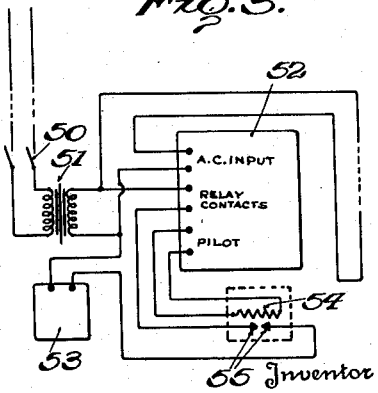

Inventor
Paul L. Betz
By Cameron, Kerkam + Sutton
Attorneys

Patented Nov. 15, 1938

2,137,199

UNITED STATES PATENT OFFICE 2,137,199

CONTROL SYSTEM FOR GAS HEATERS

Paul L. Betz, Baltimore, Md., assignor to Consolidated Gas Electric Light and Power Company of Baltimore, Baltimore, Md., a corporation of Maryland Application August 30, 1935, Serial No. 38,656

9 Claims. (Cl. 158—28)

This invention relates to electrical control systems for gas heaters such for example as gas water heaters and the like.

Gas heating systems usually are required to operate reliably and without attention in service over long periods and it is desirable to provide them with adequate safeguards against the danger of explosions, leaking gas, improper combustion, etc., in the event of abnormal conditions. For example, in thermostatically controlled or remotely controlled systems having a pilot flame, there is the danger of turning on the gas when for some reason the pilot is not functioning properly. Another abnormal condition involving elements of danger is what is termed a flashback wherein the flame flashes back through the burner orifices and burns in the chamber in which the mixture of gas and air normally takes place, resulting in failure of the system to operate properly and in incomplete combustion with production of carbon monoxide. Also, there is danger of damage to the system in the event that the temperature of the water or other substance to be heated becomes excessive. To safeguard against these and other dangers, various means have been devised heretofore, but in general, such devices have been designed individually each with respect to a particular condition without particular regard to the correlation of various safety devices into one system. The use of a plurality of such devices in one system hence tends to a multiplicity of individual controls and equipment, in many cases of different types and with increased cost.

Further, automatic or semi-automatic operation of such systems is often desirable. For example, it is desirable in many cases to operate a control system automatically and continuously in such manner as to maintain a constant temperature of the water or other substance to be heated. Also, it may be desired to operate a system automatically but only during certain periods of the day, which periods may be determined by suitable clock mechanism or at the will of the user. Systems adapted to these ends require automatically operating means for initiating, controlling and stopping the operation of the system, in addition to safety controls such as those referred to above. In the interest of simplicity, economy and reliable and efficient operation, the operating controls should be correlated with the safety controls to facilitate their combination in a complete unitary system.

One of the objects of the present invention is to provide a novel electrical control system for a gas heater which embodies both operating controls and safety devices and which is a unit in itself for automatic control and regulation of the heater.

Another object is to provide a novel control system of the type characterized above which can be set in operation either locally or remotely and either automatically or manually.

A further object is to provide a novel electrical control system for a gas heater which embodies both operating and safety controls and which is complete in itself for automatic control and regulation of the heater and is adapted for energization or deenergization merely by operating a suitable circuit closing device.

A still further object is to provide a novel electrical control system for a gas heater which embodies a single electrically controlled gas valve and an electrical control system for said valve whereby it performs the functions of a supply valve and in addition of a safety valve operable to shut off the gas or inoperative to turn on the gas in the event of various abnormal conditions of operation of the heater.

Another object is to provide a novel control system for a gas heater wherein various electrical devices are combined in a single electrical system and connected by suitable circuits so as to be energized from a common source and through a common circuit closing device for operation as a unit.

Three control systems embodying the invention have been illustrated in the accompanying drawings, but it is to be expressly understood that said drawings are for purpose of illustration only and are not to be construed as a definition of the limits of the invention, reference being had to the appended claims for this purpose.

In said drawings:

Fig. 1 is a diagrammatic view showing a gas water heater installation of conventional type equipped with a control system embodying the invention;

Fig. 2 is a sectional view of one form of electric relay suitable for use in the system of Fig. 1;

Fig. 3 is a wiring diagram of another control system embodying the invention.

Figure 4:
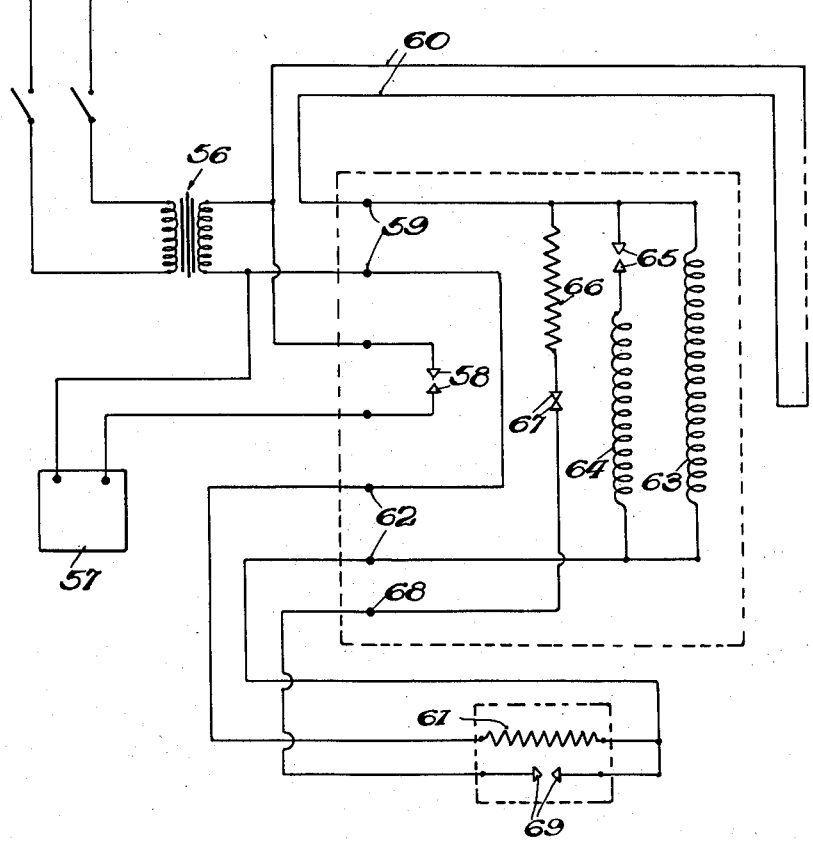
Fig. 4 is a wiring diagram of another control system embodying the invention.

The invention has been illustrated herein in connection with a gas water heater but it is to be understood that control systems embodying the invention are not restricted to this particular use but can be employed to regulate and control the operation of any gas heating installation.

As shown herein, the heater comprises a tank or boiler 1 having an inlet connection 2 for cold water and an outlet connection 3 for hot water. The water in the tank circulates through the heater 4 containing the coil 5 by means of pipes 6 and 7. Gas is supplied to the gas burner 8 through a pipe 9 preferably provided with a manually operable valve 10. In the chamber 11 the gas is mixed with air and the combustible mixture of gas and air is then delivered to the burner 8. Since this particular heating installation is shown merely to illustrate the use of the invention, its details need not be described further herein.

The flow of gas to the heater is controlled by a valve 12 located in the pipe 9, which valve is electrically controlled. Electrically controlled and operated valves of various types are known and can be obtained on the market. For example, one suitable type of such valve comprises a valve member which tends to close either by gravity or spring tension but is maintained open by an electromagnet, and this type of valve is assumed in the following description for purposes of illustration. The control system described hereinafter is therefore particularly adapted to the regulation and operation of a valve of this type in such a way that it acts not only as an automatic supply valve but also as a safety valve under various abnormal conditions.

The electrical control system is energized by a transformer 13, the circuit to which includes a suitable circuit closing device such as the switch 14. Since, as hereinafter described, the control system energized by the transformer comprises a complete operating unit, the switch 14 is not essential if the system is to operate continuously and on the other hand, if intermittent operation is desired, the switch may be controlled in any suitable manner to cause the operation of the system either periodically, or in accordance with a condition such as the water temperature, or manually whenever operation is desired, and it may be located at any desired point either adjacent to or remote from the system itself.

The operation of the system is primarily controlled by a relay which for purposes described hereinafter involves time delayed operation. While as respects the present invention any suitable type of relay having such time delayed operation can be used in conjunction with the control system, Fig. 2 illustrates as an example a suitable relay forming the subject matter of the prior application of Paul L. Betz, Serial No. 742,335, filed August 31, 1934. Briefly, this relay comprises an operating coil 15 provided with leads 16 and 17 and a movable armature 18 connected in any suitable manner with an operating rod 19. The armature 18 normally occupies the position shown in the drawings and is so disposed with respect to the winding energized through leads 16, 17 that said winding is unable to lift the armature until a supplementary winding 15a is energized through leads 20 and 21. One of said leads 20 and 21 is connected in series with normally open contacts 22, one of which is carried by a bimetallic strip surrounded by a heating coil 23. Accordingly, the armature 18 is not actuated when current is first supplied to the relay until after the interval necessary for the coil 23 to heat the bimetallic strip and thereby to close the contacts 22. The relay also comprises a pair of normally closed contacts 24 and a pair of normally open contacts 25, which are respectively opened and closed when the armature is lifted.

A relay of this type is employed in control systems embodying the present invention as a safety device to prevent opening of the gas valve until the electric pilot has had time to reach ignition temperature. This may be accomplished by controlling or operating the gas valve through the relay contacts which are not closed until after the time delay provided by the relay operation, whereas the pilot device is energized with the relay. The relay is thus the primary controlling element in the normal operation of the system, and the safety controls may suitably be arranged in such a way as to prevent the energization of the relay or to deenergize the same, in the event of an abnormal condition, whereby the valve either does not open or is closed as the case may be.

A system of this type is illustrated in Fig. 1, wherein the relay is diagrammatically shown at 26. It is provided with a pair of terminals 27 across which the normally open relay contacts 25 are connected. One of the terminals 27 is connected to one side of the transformer secondary by wires 28 and 29 whereas the other terminal 27 is connected to one of the terminals of the valve 12 by a wire 30, the other valve terminal being connected to the other side of the transformer secondary by wire 31. Thus the energizing circuit of the valve can be closed to open said valve only after the relay armature is picked up to close the contacts 25. Further, as soon as the relay is deenergized, said armature returns to the position shown in Fig. 2 with the result that contacts 25 open and permit valve 12 to close, shutting off the supply of gas to the burner 8.

The valve 12 is adapted to function both as a supply valve and as a safety valve by the incorporation of suitable safety controls which cause the interruption of the valve circuit in the event of abnormal conditions of operation of the heater. While these devices can be connected in circuit with the valve in various ways, preferably and as shown herein, they control the relay input in such a way that the relay is deenergized in the event of operation of any of the safety devices, so that when the abnormal condition no longer exists, the valve must be opened again through operation of the relay. To this end, one of the relay input terminals 32 is connected to the wire 29 leading to one side of the transformer secondary, and the other terminal 32 is connected to wire 31 leading to the other side of the transformer secondary through a control circuit which includes wires 33, 34 and 35. Wires 34 and 35 are connected to the terminals of a suitable thermostatic circuit closing device 36 which controls the operation of the relay so as to prevent the temperature of the water in the tank 1 from becoming excessive. This thermostat may be of any suitable type which is adapted to open the relay input circuit so as to deenergize the same in the event that the temperature becomes excessive.

Wires 33 and 34 are connected to the terminals of a suitable safety device operative to interrupt the input circuit to the relay in the event of a flashback from burner 8. While as respects the control system claimed herein this safety device may be of any suitable form, as shown herein it comprises one of the flashback safety devices disclosed in the copending application of Paul L. Betz and Sebastian Karrer, Serial No. 38,654, filed August 30, 1935. Briefly, the circuit between wires 33 and 34 is completed through a pair of contacts 37 supported on resilient arms 38 which tend to maintain said contacts open, the contacts being normally maintained closed by a bimetallic element 39 disposed within the mixing chamber 11 and having an extension engaging one of the arms 38. In the case of a flashback, the temperature of the bimetallic element 39 is increased and said element bends in such a direction as to permit arms 38 to open the contacts 37 and thereby to deenergize the relay.

The burner 8 is provided with an electric ignition device or pilot 40 preferably in the form of a wire adapted to become incandescent, said wire being energized through leads 41 and 42 which may, if desired, include fuses 43 and which lead to the pilot terminals 44 of the relay. The circuit within the relay is such that current is supplied to the pilot 40 as soon as the switch 14 is closed and the relay is energized, but the time delay in the operation of the relay prevents the opening of the valve 12 until after the pilot has reached ignition temperature. Preferably, also, the circuit of the relay is such that the energizing current for the relay coil or for the heating coil 23 or both must pass through the electric pilot 40. This arrangement provides an additional safety feature in that the relay cannot be energized to open the valve 12 unless current is flowing through the pilot 40.

Suitable relay connections are shown in Fig. 1. The heating coil 23 is connected at one end directly to the input terminal 32 and at the other end to one of the contacts 24 and thence by wires 45 and 46 to one of the pilot terminals 44. The main relay coil 15 is connected directly to one of the terminals 32 by means of the wire 47 and to one of the pilot terminals 44 by means of the wire 46. The supplementary relay coil 15a is connected at one end to the wire 46 and at the other end to one of the contacts 22, the other contact 22 being connected to the wire 47. The other pilot terminal 44 is connected with the input terminal 32 by wire 48.

The operation of this system will be clear from the foregoing description. Assuming that the switch 14 is closed, either manually or through any desired control means, the valve 12 is not opened because its circuit cannot be completed until relay contacts 25 are closed. The input current to the relay passes through wires 31 and 35 to the thermostatic device 36, which is closed if the temperature of the water in the system is below the desired point, thence through the safety contacts 37 which are also closed under normal conditions, and thence to the input terminal 32. From the input terminal 32 current flows through the main relay coil 15 and through the heating coil 23 and contacts 24 to the pilot terminal 44, thence through the pilot 40 and back to the pilot terminal 44, thence through a wire 48 to input terminal 32 and thence through wire 29 to the transformer secondary. The pilot 40 immediately begins to heat up, but the relay is not immediately operated to close the valve circuit because of the time delayed operation explained above. After the lapse of a suitable interval necessary for the coil 23 to heat its bimetallic strip, during which the pilot 40 reaches ignition temperature, contacts 22 are closed and the supplementary coil 15a of the relay is energized to pick up the armature 18, thereby closing the valve contacts 25 and opening the valve 12 to supply gas to the burner. The burner is ignited and the water from the tank 1 circulates through the coil 5 and is heated to the desired temperature or the operation is continued for the desired period at which point the switch 14 is opened either automatically or manually.

In the event a flashback occurs at the burner 8, the flashback safety device causes contacts 37 to open, interrupting the input circuit to the relay, whereupon relay contacts 25 open and valve 12 closes, shutting off the gas to the burner. However, unless the switch 14 should be opened, the circuit to the relay will be automatically closed as soon as the bimetallic element 39 has cooled down sufficiently to close the contacts 37, whereupon the relay is again energized and the operating cycle is again initiated. In the event that the temperature in the tank becomes excessive, the thermostat 36 is operated to interrupt the relay circuit, whereupon the valve 12 closes and the gas supply to the burner is shut off. The relay cannot be energized again until the thermostat 36 has cooled off sufficiently to close its contacts. Should the pilot be burnt out, or should it burn out during operation, the relay is at once deenergized.

The control system diagrammatically illustrated in Fig. 3 is substantially similar to that described above in connection with Fig. 1 and hence the relay and various safety devices are not shown in detail. In general, this system embodies a switch 50 and transformer 51 corresponding to the switch 14 and transformer 13, a relay 52 corresponding to the relay 26 of Fig. 1, and an electrically operated valve 53 corresponding to the valve 12 of Fig. 1, the flashback and thermostatic safety devices not being shown. This system embodies, however, an additional safety feature which insures that the valve 53 cannot be opened until the pilot 54 corresponding to the pilot 40 of Fig. 1 has reached ignition temperature. This safety device comprises a pair of normally open contacts 55 connected in the energizing circuit of the valve in series with the relay contacts above described, said contacts 55 being adapted to be closed by any suitable thermostatic device subject to the temperature of the pilot 54 and adjusted to close the contacts when the temperature reaches the proper point. This additional safety feature is desirable to insure against opening of the gas valve which might take place with the system of Fig. 1 in the event of a short-circuit of the pilot coil 40.

It will be seen that a system embodying the present invention constitutes a complete and unitary control system for a gas heater which is set in operation by the simple closing of a switch or equivalent operation. As stated above, this has the advantage that the operation of the heater can be controlled in any desired way in which the switch 14 can be operated, either automatically or manually and at any point at which it may be desired to control the operation or at which the switch is located. By leaving the switch closed or by omitting the same, the operation becomes continuous.

Moreover, a system embodying the invention correlates in unitary manner the functions of initiating, controlling and stopping the operation of the system as well as various safety functions that may be desirable. The valve in the systems shown in Figs. 1 and 3 opens and closes to control the flow of gas to the system as a supply valve, and in the absence of some abnormal condition constitutes an automatic operating control for the heater which is properly safeguarded to insure reliable and dependable operation. Thus the provision of a time delay in the operation of the relay contacts insures sufficient time before the gas is turned on for the pilot to reach ignition temperature, and the safety contacts of Fig. 3 provide an additional safety feature in the event of a short-circuit of the pilot or the like. Due to the deenergization of the supplementary relay coil after the relay operates, the relay is maintained in a condition such that it returns practically instantaneously to initial position on interruption of the current, and therefore every interruption of service, however temporary or accidental, is followed by another complete starting cycle. Such automatic operation of the system is not interfered with in any way by the safety controls, and yet the latter are operable in the event of abnormal conditions to interrupt the current to the relay whereby it returns instantaneously to initial position as described above.

Preferably the contacts 55 shown in Fig. 3 are so adjusted that they normally close before the operation of the relay. Also in the normal operation of the system the valve 53 closes on deenergization of the relay while said contacts 55 remain closed. Hence in normal operation the circuit is neither made nor broken by contacts 55 while current is flowing.

In a system such as that just described with reference to Fig. 3, the safety contacts associated with the pilot device can be utilized to prevent opening of the supply valve indirectly by suitably connecting them to prevent the operation of the control relay and thus indirectly of the valve itself. A system of this type is illustrated in Fig. 4, which except for the safety contacts and their connection to the relay is the same as that shown in Fig. 1. The relay diagrammatically shown in Fig. 4 is energized from a transformer 56, the valve 57 having one terminal connected directly to the transformer secondary and the other terminal connected to the other side of the transformer secondary through the relay contacts 58 corresponding to the relay contacts 25 of Fig. 1. One of the relay input terminals 59 is connected directly to the transformer and the other is connected thereto through a circuit 60 which as indicated by the dotted lines may include safety devices such as the thermostat and flashback control of Fig. 1. The pilot coil 61 is connected across the pilot terminals 62, one of which is connected with one of the input terminals as in Fig. 1. The main relay coil 63 and the supplementary coil 64 are connected in parallel with each other and across one of the terminals 59 and one of the terminals 62, the circuit of coil 64 including normally open contacts 65 corresponding to the contacts 22 of Fig. 1.

As thus far described, the system of Fig. 4 is the same as the system of Fig. 1. As explained above, the relay operation in Fig. 1 is dependent on the bimetallic element and its heating coil, and the same is true with the system of Fig. 4. In the latter system, however, the safety contacts associated with the pilot are connected in series with the heating coil instead of with the valve as in Fig. 3. In this manner the contacts act to prevent operation of the relay until the pilot has reached ignition temperature, the operation of the valve being in turn controlled by the relay. To this end the heating coil 66 and its contacts 67 (corresponding to the coil 23 and contacts 24 of Fig. 1) are connected in series in a circuit one end of which leads to one of the input terminals 59 and the other end of which leads to a terminal 68. The pilot safety contacts 69 are connected between this terminal 68 and the pilot circuit. The circuit of the heating coil 66 is therefore completed by way of the terminal 68, contacts 69, and the pilot circuit to the terminal 62.

When current is first supplied to this system, it passes through the main relay coil 63 and pilot coil 61 in series, but the circuits of the heating coil 66 and the supplementary relay coil 64 are open. As the pilot coil heats up to ignition temperature, the contacts 69 close, thereby completing the circuit through the heating coil 66 and contacts 67. The operation of the relay then proceeds as described above in connection with Fig. 1. It will be seen that as long as the contacts 69 are closed, the operation of the system of Fig. 4 is the same as the operation of the system of Fig. 1. However, the relay is inoperative and the system cannot operate unless the contacts 69 are closed or in other words unless the pilot coil 61 is at ignition temperature.

The provision of an electric control system with operating controls and safety controls of the same type enables the provision of a unitary system which is simple and economical and yet reliable and provided with all necessary safeguards, and at the same time enables the use of a single valve to perform the functions of an operating control valve and of a safety control valve operable under various conditions.

While several systems embodying the invention have been illustrated and described above, it is to be expressly understood that the invention is not limited to these embodiments but that various changes can be made in the circuit connections, in the operating or safety controls, in the form of the several elements employed, etc., without departing from the spirit of the invention. In particular, it will be seen that any suitable type of relay having time delayed operation can be employed to close the valve operating contacts after a suitable interval in which the pilot reaches ignition temperature. Any suitable type of safety device can be employed which will effect the interruption of the relay input current in the event of any abnormal condition of the heater which it is desired to avoid, whether thermostatically operated or otherwise. Also, any suitable type of electrically controlled or operated valve may be associated with and controlled by the system. Reference is, therefore, to be had to the appended claims for a definition of the limits of the invention.

What is claimed is:

1. An electrical control system for a gas heater comprising in combination an electrically controlled valve, a valve operating circuit including relay contacts, an electric pilot, a relay holding coil and a supplementary relay coil necessary for closing said contacts to open said valve, means for delaying the energization of said supplementary coil for a predetermined period after said holding coil is energized whereby said valve contacts have time delayed operation, said pilot being connected in series with said holding coil, and means for energizing said relay.

2. An electrical control system for a gas heater comprising in combination an electrically controlled valve, a valve operating circuit including relay contacts, an electric pilot, a relay holding coil and a supplementary relay coil necessary for closing said contacts to open said valve, means for delaying the energization of said supplementary coil for a predetermined period after said holding coil is energized whereby said relay contacts have time delayed operation, an energizing circuit for said relay coils, said pilot being connected in series with said holding coil and one or more safety devices in said relay energizing circuit and adapted to open the same to deenergize said relay means in the event of an abnormal condition of said heater.

3. In a gas heating system, a relay, a relay energizing circuit, an electric pilot device connected in series with said relay energizing circuit, an electrically controlled valve, a valve operating circuit including relay contacts and a pair of normally open contacts, thermostatic means responsive to heat from said piot for closing said normally open contacts, and means for delaying operation of said relay for closing said relay contacts.

4. In a gas heating system, a relay, a relay energizing circuit, a safety device in said circuit and adapted to open the same in the event of an abnormal condition of said system, an electric pilot device connected in series with said relay energizing circuit, an electrically controlled valve, a valve operating circuit including relay contacts and a pair of normally open contacts, thermostatic means responsive to heat from said pilot for closing said normally open contacts, and means for delaying operation of said relay for closing said relay contacts.

5. In a gas heating system, a gas burner, a controlling relay, a relay energizing circuit, a safety device in said energizing circuit and adapted to open the same in the event of flashback in said burner, a second safety device in said energizing circuit and adapted to open the same in the event of excessive temperature in said system, an electrical pilot for igniting said burner and connected in series with said relay energizing circuit, an electrically controlled valve, a valve operating circuit including relay contacts, and means for delaying operation of said relay whereby said relay contacts are not closed until after a predetermined interval following the energization of said pilot.

6. In a gas heating system, a gas burner, a controlling relay, a relay energizing circuit, a safety device in said energizing circuit and adapted to open the same in the event of flashback in said burner, a second safety device in said energizing circuit and adapted to open the same in the event of excessive temperature in said system, an electrical pilot for igniting said burner and connected for energization in series with said energizing circuit, an electrically controlled valve, a valve operating circuit including relay contacts and a pair of normally open contacts, means for delaying operation of said relay for closing said relay contacts, and thermostatic means responsive to heat from said pilot for closing said normally open contacts.

7. In a gas heating system, a relay, a relay operating circuit including a pair of normally open contacts, an electric pilot device connected in series with said relay, an electrically controlled valve, a valve operating circuit incuding relay contacts, thermostatic means responsive to heat from said pilot for closing said normally open contacts, and means for delaying operation of said relay for closing said relay contacts a predetermined interval after said normally open contacts are closed.

8. In a gas heating system, a relay, a relay energizing circuit including a safety device adapted to open said circuit in the event of an abnormal condition of said system, an electric pilot connected in series with said relay, an electrically controlled valve, a valve operating circuit including relay contacts, a relay operating circuit including a pair of normally open contacts, thermostatic means responsive to heat from said pilot for closing said normally open contacts, and means for delaying operation of said relay for closing said relay contacts a predetermined interval after said normally open contacts are closed.

9. An electrical control system for a gas heater comprising in combination an electrically controlled valve, a valve operating circuit including relay contacts, a relay holding coil and a supplementary relay coil necessary for closing said contacts to open said valve, a control circuit including means having time delayed operation for delaying the energization of said supplementary coil for a predetermined period after said holding coil is energized whereby said relay contacts have time delayed operation, an electric pilot connected in series with said holding coil, a pair of normally open contacts in said control circuit, and thermostatic means responsive to heat from said pilot for closing said normally open contacts.

PAUL L. BETZ.